June 29, 1937.　　W. R. GRISWOLD　　2,085,019
MOTOR VEHICLE
Filed Jan. 17, 1936　　2 Sheets-Sheet 1
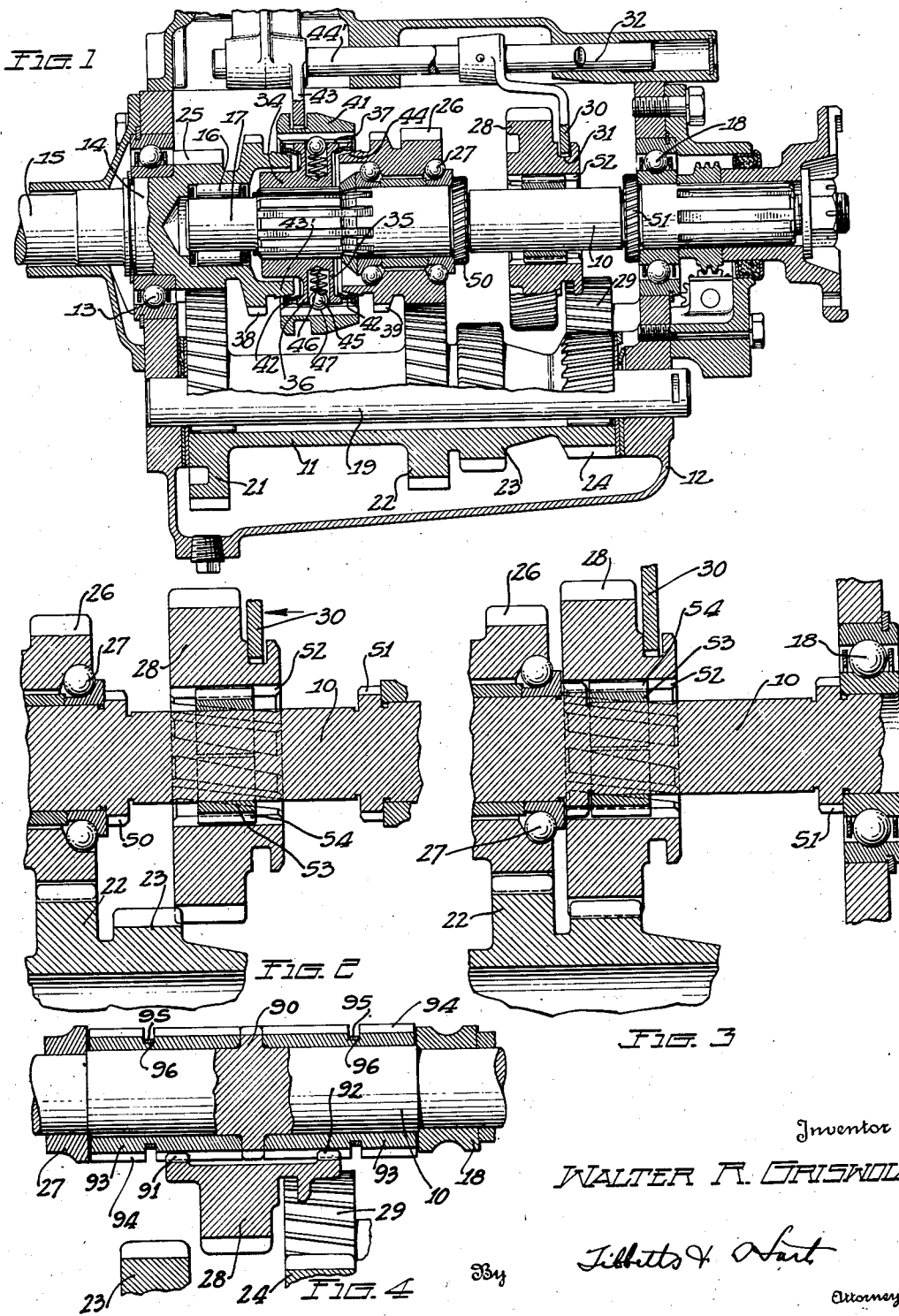
Inventor
WALTER R. GRISWOLD
By Tibbetts & Hart
Attorneys

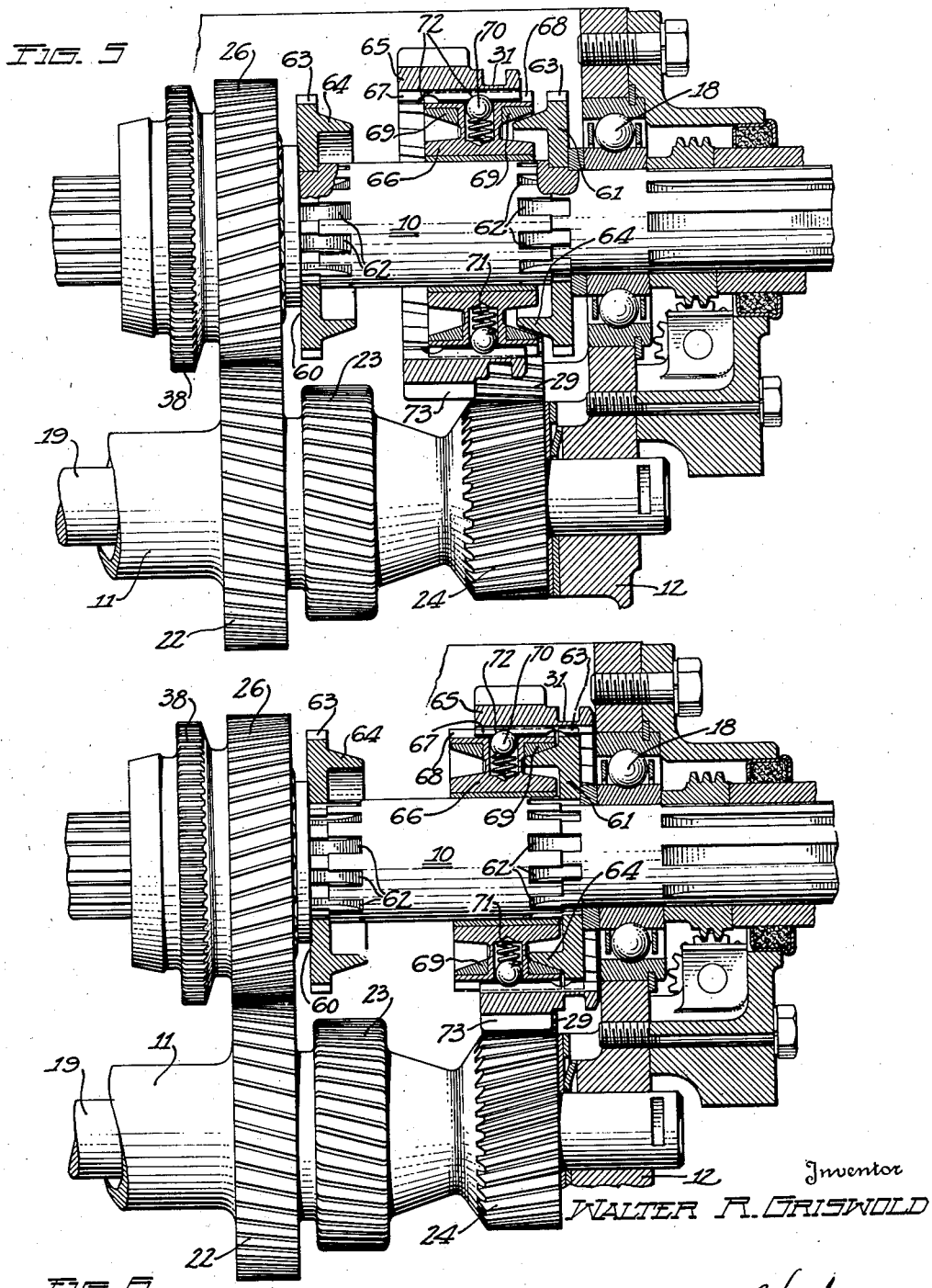

Patented June 29, 1937

2,085,019

UNITED STATES PATENT OFFICE 2,085,019

MOTOR VEHICLE

Walter R. Griswold, Detroit, Mich., assignor to Packard Motor Car Company, Detroit, Mich., a corporation of Michigan Application January 17, 1936, Serial No. 59,528

12 Claims. (Cl. 74—333)

This invention relates to transmission mechanism and more particularly to the type of such mechanism employed with motor vehicles.

Driving mechanism for motor vehicles can be divided into two groups, one group including the gears and associated parts rotated in a constant relation with the crank shaft or clutch shaft and the other group including the gears and elements rotated in a constant relation to wheel or vehicle speed. It is customary to provide shiftable gears which are fixed to rotate with one group and movable to engage with gears in the other group in order to establish different forward speed drives and a reverse drive. The inertia of the two groups is usually different and the gears to be meshed are ordinarily rotating at different pitch line velocities which must be equalized in establishing the drive. Considerable physical effort is required to mesh the gears selected to be so engaged and clash results when the teeth are forced into engagement. In addition to this, a small number of teeth are interengaged so that all the shock load is placed thereon which often causes chipping or breakage.

It is an object of the present invention to provide a transmission mechanism in which the above undesirable results are considerably reduced.

Another object of my invention is to provide a transmission mechanism with shiftable driving connection means which can be moved with minimum physical effort and in a manner to distribute the shock load evenly around the parts being meshed.

Another object of the invention is to provide transmission mechanism for motor vehicles in which the driving connection for low forward speed and reverse can be made without noise and undue strain upon the parts and without complicated structure which includes constantly meshing gears.

Other objects of the invention will appear from the following description taken in connection with the drawings, which form a part of this specification, and in which:

Fig. 1 is a sectional view of a transmission mechanism incorporating my invention.

Fig. 2 is a fragmentary sectional view of the same illustrating the shiftable clutch element in the first part of its movement toward establishing a low forward driving connection.

Fig. 3 is a similar sectional view showing the movable clutch element fully moved to establish a forward low speed driving connection.

Fig. 4 is a sectional view similar to Figs. 2 and 3 showing a modified form of clutch means and mounting therefor, the clutch being in effective relation.

Fig. 5 is a fragmentary sectional view of a transmission illustrating a modified form of clutch device in a position while being moved to establish a reverse driving connection.

Fig. 6 is a sectional view similar to that shown in Fig. 5 with the movable clutch device in fully adjusted position to establish a reverse driving connection.

Referring to the drawings, in Fig. 1 is shown a motor vehicle transmission comprising a driven shaft 10 and a countershaft or gear spool 11 mounted in a casing 12. The front wall of the casing carries a suitable bearing 13 in which is mounted the enlarged end 14 of a driving shaft 15, which shaft may be the clutch shaft driven from the vehicle engine through conventional clutch mechanism (not shown). The enlarged end 14 of the clutch shaft is formed with an axial recess for the reception of a bearing 16, in which the reduced forward end 17 of the driven shaft is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19 supported at its ends by the front and rear walls of the transmission casing, and this spool is formed with a number of integral helical gears 21, 22, 23, 24. Gear 21 is in constant mesh with gear 25, formed on the enlarged end of the driving shaft 15, so that the countershaft 11 is continuously connected to and driven from the clutch shaft 15 in the well known manner. Gear 22 is continuously in mesh with a gear 26 mounted for rotation on bearing means 27 mounted on the driven shaft 10.

To provide the second and high speed connections, the forward portion of the shaft 10 is provided with a clutch device which is slidably secured to the shaft between the gears 25 and 26. This clutch device constitutes a splined hub portion 34, slidably mounted on splines on the driven shaft 10 and rotatable therewith, a radial web portion 35 and a rim portion 36 which is provided with external splines or teeth 37. These teeth are adapted for connection either to clutch teeth 38, formed on the shaft end 14 adjacent the gear 25, or to clutch teeth 39 formed on the body of gear 26, these clutch teeth 37, 38 and 39 being of the same pitch. Clutch ring 41 is slidably mounted on and surrounds the rim 36, and is formed with internal splines cooperating with the splines 37 which may engage teeth 38 when moved forwardly of the transmission, and may engage the teeth 39 when moved rearwardly thereof. To effect such sliding movement, the clutch ring has a shifter fork 43 associated therewith, such fork being connected to a shifter rod 44' adapted to be operated by a conventional shift lever (not shown). It will be evident that when the clutch ring is in engagement with the teeth 39, the gear 26 is locked to the driving shaft, providing the second speed, and that when the teeth 38 are engaged with the clutch ring the shafts 10 and 15 are directly positively coupled, giving third speed which is direct drive.

To perform the clutching operation just described without shock or clash synchronizing mechanism is provided to bring the pairs of clutch teeth 37—38 or 37—39 to the same speed before positive engagement of the clutch ring 41. For this purpose, the oppositely disposed inner edges of the rim portion 36 have conical brake or friction rings 42 associated therewith. The forward ring is arranged to contact a conical friction surface 43' on the rear end of the drive shaft 15 and the rear ring is arranged to contact a conical friction surface 44 on the body of gear 26 in advance of the teeth 39. Balls 45 are arranged in radial slots in the rim and web portions of the clutch device and are pressed outwardly by coil springs 46 to engage the splines on the clutch ring 43. These ring splines are formed with recesses 47 aligning radially with and for receiving the balls to thereby provide a disconnectable coupling between the clutch device and the clutch ring.

As shown in Fig. 1, the clutch ring is in disengaged relation with the clutch teeth 38 and 39. Forward movement of the fork 43 will move both the clutch device and the clutch ring forwardly, as they are coupled by the balls in the recess 47, until the forward band engages the friction surface 43. The shafts 10 and 15 are thus brought to the same speed and further forward shifting of the clutch ring engages the splines on the clutch ring with the clutch teeth 38, thereby forming a direct positive coupling between shafts 15 and 10. When second speed is desired the clutch ring is shifted rearwardly from its neutral position shown in Fig. 1 until the friction ring 42 engages the friction surface 44 on gear 26. The clutch ring and the gear 26 are brought to the same speed by this friction contact and the ring is then further shifted until its splines mesh with the clutch teeth 39. This forms the second speed drive which is effected from shaft 15 to shaft 10 through meshing gears 25 and 21, 22 and 26, and the clutch device.

The transmission mechanism so far described is well known in the art and with such mechanism a gear is splined on the driven shaft and is axially shiftable to engage the low speed gear on the countershaft or the reverse idler to establish the low speed and reverse driving connections. The shifting of such gear into mesh with the low speed gear and the reverse idler usually results in application of undesirable force, clashing and successive efforts when the countershaft and driven shaft are turning at different speeds, which is generally the case.

I will now describe that part of the transmission incorporating my invention. Gears 23 and 24 constitute the low speed and reverse gears respectively, and are adapted to drive a gear 28 which is rotatably mounted on shaft 10 and shiftable axially thereon. Gear 28 is directly engageable with gear 23 or it may be shifted to mesh with a reverse idler gear 29 in the well known manner, the idler being in constant mesh with gear 24. The axial shifting of gear 28 is effected by means of a shifter fork 30 which engages in a groove 31 in the gear body, this fork being actuated by a shifter rod 32 slidably mounted in suitable bearings in the upper part of the transmission casing. The shifter rod is selectively engageable for actuation by the hand shifter lever (not shown).

Referring now to Figs. 1 to 3 inclusive, two sets of helical clutch teeth 50 and 51 are formed on the shaft 10, and the gear 28 is formed with interior helical splines 52 for engaging either set of these clutch teeth. As the gear 28 must be moved across the teeth 51 for assembly with or disassembly from the shaft 10, a split floating bushing 53 is arranged between gear 28 and the shaft and is formed with helical exterior splines 54 meshing with splines 52. This bushing lies intermediate the teeth 50 and 51 and can be of desired length. The gear 28 and its bushing are axially shiftable and rotatably mounted on shaft 10, the bushing being shiftable axially more or less distance depending upon its length.

As shown in Fig. 1, the gear 28 is in neutral or non-driving position. When it is desired to drive shaft 10 from shaft 15 at low speed, gear 28 is shifted forwardly into engagement with gear 23, as shown in Fig. 2, and as forward shifting of the gear continues splines 52 engage with clutch teeth 50 on shaft 10 as shown in Fig. 3. To drive the shaft 10 in reverse from shaft 15, gear 28 is shifted rearwardly to engage idler 29 and while being rotated thereby, further rearward shifting will engage splines 52 with clutch teeth 51.

The gears on the drive shaft, the countershaft and the gears in constant mesh with the countershaft gears constitute one group which is always rotating in a constant relation to engine speed while the gears usually fixed to the driven shaft constitute a second group and always rotate in constant rotation to vehicle speed. When a gear train is to be established between the two groups, it is seldom that the pitch line velocity of the gears to be meshed is the same. The relative inertia of the parts connected with the two groups of gears is different and the inertia of the two groups and the pitch line velocity of the gears to be meshed must be equalized during the establishment of a driving relation. This equalization is usually established by physical effort and under the circumstances undesirable effort is required and there is a clashing of the gears which is noisy and sometimes results in deformation and breakage of the gear teeth. Also the time element sometimes required to mesh such gears results in an unduly long disconnected drive which sometimes results in accident because of lack of control.

By loosely mounting the gear 28 on the driven shaft instead of fixing it thereon, as is customary, a relatively small inertia must be overcome in meshing it with either gear 23 or 29 to establish low or reverse driving connection with the driving shaft. While being driven by the idler or low speed gear, the endwise movement of gear 28 is continued to engage the splined portion 52 with the clutch teeth 50 or 51 on the driven shaft and this endwise engagement of the clutch elements distributes the shock load, caused by their engagement, equally around the driven shaft and the shiftable gear instead of localizing it on one or two peripheral teeth which is customary when the shiftable clutch element is fixed on its shaft. As a result, the shift can be made to low speed or reverse positively, quietly and with little physical effort.

In Fig. 4 shaft 10 instead of having the two sets of clutch teeth 50 and 51, as shown in Figs. 1 to 3 inclusive, has a helically splined portion 90, and the gear 28 instead of having a continuous internal splined surface 52, as shown in Figs. 1 to 3 inclusive, has two sets of spaced helical splines 91 and 92. Floating split bushings 93 surround shaft 10 intermediate the splined portion 90 and bearings 27 and 18, such bushings having peripheral helical teeth 94 the same as the previously described bushing 53. The splines 91 and 92 engage with the peripheral splines 94 on the bushings and split rings 95 are arranged in grooves 96 in the bushings to retain them in position when the gear 28 is moved to a position near the splined portion of shaft 10. The splines 94 are arranged to align with the splines on the portion 90 of shaft 10 and the bushings are of slightly less length than the distance between the shaft portion 90 and bearings 18 and 27 and they are free to float on shaft 10.

In moving gear 28 to establish low direct or reverse drive, the action is similar to that previously described. To establish low direct drive, gear 28 is shifted to the left or forwardly to engage gear 23 and further movement in this direction engages the clutch teeth 92 with the splined portion 90 on shaft 10. To establish reverse gear, the gear 28 is shifted to the right or rearwardly to engage gear 29 and further movement in this direction engages the clutch teeth 91 with the splined portion 90 on shaft 10.

In Figs. 5 and 6, I have illustrated another modified form of the invention. In this form of the invention the clutch elements 60 and 61 are applied to the driven shaft 10 instead of being formed thereon and are formed with interior splines which engage splines 62 formed on the driven shaft. These clutch elements include peripheral teeth 63 and a friction cone portion 64 extending from one side thereof.

The rotatable shiftable clutch device for engaging the idler 29 or the gear 23 on the countershaft is somewhat different in form than that previously described. This clutch element consists of two sections 65 and 66 which are movable in an axial direction relatively and are connected by interengaging splines 67 and 68. The section 66 is provided with internal friction rings 69 for engagement with the friction cones 64. There are radial openings through the periphery of the inner section in which are balls 70 normally urged outwardly by coil springs 71. The splines 67 overlying these balls are formed with a pair of recesses 72 so that the balls engaging in such recesses form a releasable connection tending to prevent relative axial movement of the sections 65 and 66. The outer section 65 is formed with a recess 31 into which a shifter fork extends in the same manner as set forth in the previous description. The periphery of the outer section 65 is formed with helical teeth 73 for engagement with the helical teeth of gears 23 and 29.

In Fig. 5 the mechanism is shown in a shifted relation wherein the clutch device is being moved to establish a reverse driving relation and the teeth 73 are just commencing to mesh with the idler 29. During such movement from a neutral position the sections 65 and 66 are moved together because of the driving relation the balls 70 establish through their engagement while in the recesses 72. Continued movement of the device further meshes the teeth 73 with the idler 29 and also brings the friction ring 69 into engagement with the cone 64 on the clutch element 61. This frictional engagement brings the idler 29 and the clutch element 61 to the same speed so that the splines 67 can engage with splines 63 of the clutch element 61 without clashing. After synchronizing takes place the further shifting of the movable clutch device overcomes the pressure exerted by the springs 71 against the balls and displaces the balls from the recesses 72 so that the section 65 can be moved into meshing relation with the teeth of the clutch element 61, as shown in Fig. 6. When the clutch section 65 has been moved to fully mesh with the teeth 63 on the clutch element 61, then the balls will be seated in the recesses 72 at the left or forward end of the clutch device as shown in Fig. 6 and the locking arrangement between the sections 65 and 66 is again established so that the shiftable clutch device can be moved as a unit while being disengaged from the clutch element 61.

An operation similar to that just described takes place when the movable clutch element is moved to engage the gear 23 and the clutch element 60 so that a description of this operation is not believed to be necessary to fully understand the functioning of the mechanism.

This clutch device with a synchronizing means has the same advantages as the clutch devices previously described and in addition provides a quiet engagement between the fixed and movable clutch elements. Ordinarily synchronizing is not required in transmission mechanism for the establishment of first speed and reverse driving connections but this arrangement is sometimes desirable. This synchronized driving connection need not necessarily be associated with low speed or reverse drives but applies equally as well to high speed drives.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A transmission comprising a driving shaft, a driven shaft, a countershaft, meshing gears connecting said driving shaft with said countershaft, an axially shiftable gear rotatably mounted on said driven shaft, clutch teeth fixed on said driven shaft adapted to be engaged by said slidable gear, a bushing on said driven shaft having teeth engaged by said shiftable gear, means for shifting said slidable gear, and a gear fixed on said countershaft in a relation to be engaged by said sliding gear prior to and during its engagement with said clutch teeth.

2. A transmission comprising a driving shaft, a driven shaft, a countershaft, meshing gears connecting said driving shaft with said countershaft, helical clutch splines around said driven shaft, a helical gear rotatable and slidable on said driven shaft, said gear having internal helical clutch teeth adapted to engage said clutch teeth when shifted axially on said driven shaft, a bushing rotatable on said shaft having helical peripheral teeth engaged by the internal teeth of said slidable gear and a helical gear fixed on said countershaft, said fixed gear being located in a relation to be engaged by said slidable helical gear prior to and during its engagement with said helical clutch splines on said driven shaft.

3. A transmission comprising a driven shaft, a driver shaft paralleling said driven shaft, clutch teeth on said driven shaft, a bushing on said driven shaft having peripheral teeth, a gear fixed on said driver shaft, and a gear rotatably mounted and slidable on said driven shaft and engageable with said gear fixed on said driver shaft, said slidable gear having internal splines engageable with said clutch teeth and said bushing teeth.

4. A transmission comprising a driving shaft, a driven shaft, a countershaft, two sets of clutch teeth spaced axially on said driven shaft, a bushing freely rotatable on said driven shaft between the sets of clutch teeth, said bushing having peripheral teeth, a low speed gear fixed on said countershaft adjacent one of said sets of clutch teeth, a reverse gear fixed on said countershaft adjacent the other set of clutch teeth, an idler gear meshing with said reverse gear, and a gear rotatable and axially shiftable on said driven shaft, said gear being peripherally engageable with said low gear and said idler in its axial movement and having spline means engageable with the teeth on said bushing and selectively engageable with either of said sets of clutch teeth on said countershaft.

5. In a transmission for motor vehicles, a driving shaft, a countershaft geared to said driving shaft, a driven shaft parallel with the countershaft, a gear driven by said countershaft, a clutch element fixed on said driven shaft in line with said gear on the countershaft, a gear rotatable and axially shiftable on said driven shaft, said rotatably mounted gear being engageable with the gear driven by said countershaft and having internal clutch teeth engageable with said clutch element, a bushing freely rotatable on said driven shaft having peripheral teeth engaged by the interior teeth of said shiftable gear, and synchronizer means for bringing said slidable gear and said fixed clutch element to the same speed before engagement.

6. In a transmission for motor vehicles, a driving shaft, a countershaft geared to said driving shaft, a gear driven by said countershaft, a driven shaft parallel with said countershaft, a clutch element fixed to said driven shaft in alignment with said driven gear, said clutch element having peripheral teeth and a friction surface projecting from one side thereof, and clutch means rotatable and slidable on said driven shaft, said clutch means having telescoping sections movable axially relatively, the inner member having a friction surface for engaging the friction surface of said fixed clutch element and an outer section for meshing peripherally with said gear driven by said countershaft, said clutch sections being connected by splines and the splines of said outer section being engageable with the teeth of said clutch element fixed to said driven shaft.

7. In a transmission mechanism, the combination of a shaft, a clutch member in fixed relation on said shaft, said clutch member having teeth extending across the periphery thereof, a bushing freely mounted on said shaft adjacent said fixed clutch member and having teeth extending across the periphery thereof similar to the teeth on said clutch member and adapted to align therewith, and an axially shiftable clutch member having internal teeth engageable with the peripheral teeth on said fixed clutch member and on said bushing, said shiftable clutch member being axially movable endwise entirely across said fixed clutch member during meshing relation therewith.

8. In a transmission mechanism, the combination of a shaft, a clutch member in fixed relation on said shaft, said member having teeth extending across the periphery thereof, a bushing freely mounted on said shaft adjacent said fixed clutch member and having teeth extending across the periphery thereof similar to the teeth on said clutch member and adapted to align therewith, said bushing consisting of sections separated in an axial direction, and an axially shiftable clutch member having internal teeth engageable with the peripheral teeth on said fixed clutch member and on said bushing, said shiftable clutch member being axially movable endwise entirely across said fixed member during meshing engagement therewith to assemble or disassemble the same.

9. In a transmission mechanism, the combination of a shaft, a pair of similar spaced clutch members in fixed relation on said shaft, said clutch members having teeth extending across the periphery thereof, a bushing freely mounted on said shaft intermediate said fixed clutch members and having peripheral teeth similar to the teeth on said clutch members and adapted to align therewith, said bushing consisting of sections separated in an axial direction, and an axially shiftable clutch member having internal teeth engageable with the peripheral teeth on said fixed clutch members and on said bushing, said shiftable clutch member being axially movable endwise entirely across said fixed clutch members and said bushing during meshing engagement therewith for the purpose of assembly or disassembly.

10. In a transmission mechanism, the combination of a shaft, a clutch member in fixed relation on the shaft, said member having teeth extending across the periphery thereof, bushings freely mounted on said shaft adjacent each end of said clutch member and having peripheral teeth similar to the teeth on said clutch member and adapted to align therewith, said bushings consisting of sections divided in an axial direction, and an axially shiftable clutch member having internal teeth at each end thereof engageable with the peripheral teeth on said fixed clutch member and on said bushings, said shiftable clutch member being axially movable endwise entirely across said fixed clutch member and said bushings during meshing relation therewith to assemble and disassemble the same.

11. In a transmission mechanism comprising a shaft, a pair of similar clutch members fixed in spaced relation on said shaft, said members having helical peripheral teeth, an axially shiftable clutch member on said shaft intermediate said fixed clutch members, said shiftable clutch member having peripheral helical teeth and internal helical splines, said internal splines extending the entire width of said shiftable clutch member and adapted to mesh with the teeth of said fixed clutch members, a bushing rotatably mounted on said shaft intermediate said fixed clutch members, said bushing having external helical teeth meshing with the internal splines of said shiftable clutch member and being split in an axial direction into a plurality of sections, and a pair of helical driven gear means arranged to be engaged by the peripheral teeth of said shiftable clutch member prior to and during driving engagement with said fixed clutch members, said shiftable clutch member being axially movable across said bushing and fixed clutch members during meshing relation therewith for the purpose of assembly and disassembly.

12. In a transmission mechanism, the combination of a shaft, a clutch member in fixed relation on said shaft, said clutch member having helical teeth extending across the periphery thereof, a bushing freely mounted on said shaft adjacent said clutch member and having helical teeth extending across the periphery thereof similar to the teeth on said clutch member and adapted to align therewith, said bushing consisting of sections divided in an axial direction, and an axially shiftable clutch member having internal helical teeth engageable with the peripheral teeth on said fixed clutch member and on said bushing, said shiftable clutch member being axially movable endwise entirely across said bushing and said fixed clutch member during meshing relation therewith.

WALTER R. GRISWOLD.